US010370822B2

(12) United States Patent
Yamashita

(10) Patent No.: US 10,370,822 B2
(45) Date of Patent: Aug. 6, 2019

(54) CONSTRUCTION MACHINE

(71) Applicant: KOBELCO CONSTRUCTION MACHINERY CO., LTD., Hiroshima-shi (JP)

(72) Inventor: Koji Yamashita, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/577,135

(22) PCT Filed: Apr. 13, 2016

(86) PCT No.: PCT/JP2016/061954
§ 371 (c)(1),
(2) Date: Nov. 27, 2017

(87) PCT Pub. No.: WO2016/189993
PCT Pub. Date: Dec. 1, 2016

(65) Prior Publication Data

US 2018/0179734 A1 Jun. 28, 2018

(30) Foreign Application Priority Data

May 28, 2015 (JP) ................................ 2015-108553

(51) Int. Cl.
*G06G 7/70* (2006.01)
*G06F 19/00* (2018.01)
(Continued)

(52) U.S. Cl.
CPC .............. *E02F 9/2033* (2013.01); *E02F 3/43* (2013.01); *E02F 3/435* (2013.01); *E02F 3/963* (2013.01);
(Continued)

(58) Field of Classification Search
CPC ......... E02F 9/2033; E02F 3/435; E02F 3/963; E02F 3/43; G08B 21/00
(Continued)

(56) References Cited

U.S. PATENT DOCUMENTS 6,230,090 B1 * 5/2001 Takahashi .............. E02F 3/435 212/280
2003/0214415 A1 * 11/2003 Shaw ...................... B66C 13/44 340/685

FOREIGN PATENT DOCUMENTS

JP 4-122755 U 11/1992
JP 5-272154 A 10/1993
(Continued)

OTHER PUBLICATIONS

International Search Report dated Jul. 12, 2016 in PCT/JP2016/061954 filed Apr. 13, 2016.

*Primary Examiner* — Mahmoud S Ismail
(74) *Attorney, Agent, or Firm* — Oblon, McClelland, Maier & Neustadt, L.L.P.

(57) ABSTRACT

When it is confirmed that a distal end portion of an attachment has reached a predetermined distance detection start position apart from a cab on the basis of a posture of the attachment detected by posture detector, a control apparatus determines whether or not an object to be detected has reached a predetermined stop position closer to the cab than the distance detection start position on the basis of a distance of the object to be detected by a distance detection sensor, and controls the drive unit so as to stop the attachment when determining that the object to be detected has reached the stop position, and the control apparatus controls the drive unit so that the speed of the distal end portion of the attachment becomes a predetermined target speed or lower
(Continued)

when the distal end portion of the attachment reaches the distance detection start position.

2 Claims, 7 Drawing Sheets

(51) Int. Cl.

| | |
|---|---|
| ***G06G 7/00*** | (2006.01) |
| ***G06G 7/76*** | (2006.01) |
| ***E02F 9/20*** | (2006.01) |
| ***E02F 3/43*** | (2006.01) |
| ***E02F 9/24*** | (2006.01) |
| ***E02F 3/96*** | (2006.01) |
| *B66C 13/30* | (2006.01) |
| *G08B 21/00* | (2006.01) |
| *B66C 1/04* | (2006.01) |
| *E02F 3/32* | (2006.01) |

(52) U.S. Cl.
CPC .................. *E02F 9/24* (2013.01); *B66C 1/04* (2013.01); *E02F 3/32* (2013.01)

(58) Field of Classification Search
USPC ............................. 701/50; 212/280; 340/685
See application file for complete search history.

(56) References Cited

FOREIGN PATENT DOCUMENTS

| | | | |
|---|---|---|---|
| JP | 2001-64992 | A | 3/2001 |
| JP | 2009-121175 | A | 6/2009 |
| JP | 2014-163156 | A | 9/2014 |

* cited by examiner

CONSTRUCTION MACHINE

FIELD OF THE INVENTION

The present invention relates to a construction machine having a machine body formed with an operation room, and an attachment attached to the machine body in a displaceable manner, and configured to prevent interference between the operation room and the attachment.

DESCRIPTION OF RELATED ART

Conventionally, there has been known a construction machine including a machine body formed with an operation room, an attachment attached to the machine body, drive unit for driving the attachment, posture detector for detecting a posture of the attachment, and a control apparatus configured to control the drive unit so as to prevent interface between the attachment and the operation room.

The attachment has a boom having a base end portion rotatably attached to the machine body, an arm having a base end portion rotatably attached to a distal end portion of the boom, and a bucket rotatably attached to a distal end portion of the arm.

The drive unit has a boom cylinder configured to rotatively drive the boom with respect to the machine body, an arm cylinder configured to rotatively drive the arm with respect to the boom, and a bucket cylinder configured to rotatively drive the bucket with respect to the arm.

The posture detector has a boom angle sensor configured to detect an angle of the boom with respect to the machine body, and an arm angle sensor configured to detect an angle of the arm with respect to the boom.

The control apparatus specifies (arithmetically operates) a distal end position of the attachment on the basis of detection results of the boom angle sensor and the arm angle sensor, and information of a rotation range of the bucket.

Moreover, on the basis of information relating to the specified distal end position of the attachment and a position of the operation room, the control apparatus controls the drive unit so that the attachment stops at a stage where the distal end position of the attachment has reached a boundary of a preset interference area outside the operation room.

However, the posture detector specifies the distal end position of the attachment on the basis of the angles of the boom and the arm, and for example, in the case where an object held by the attachment protrudes on a cab side from the distal end position of the attachment, the position of this object cannot be specified.

Consequently, for example, as described in Patent Literature 1, there has been known a construction machine including a distance detector including an ultrasonic sensor, an optical sensor and the like, in place of the angle sensors, to detect a distance from a cab to an object approaching the cab by the distance detector.

However, since the distance detector described in Patent Literature 1 has a characteristic that as a speed of the object to be detected becomes higher, a detection accuracy becomes lower, a speed of the attachment needs to be suppressed in order to obtain a sufficient detection accuracy.

Therefore, there is a problem that even in a state where the attachment is sufficiently apart from the cab, the speed of the attachment is limited in order to accurately detect a distance from the cab to the attachment.

CITATION LIST

Patent Literature

Patent Literature 1: Japanese Unexamined Patent Application Publication No. 2001-64992

SUMMARY OF INVENTION

An object of the present invention is to provide a construction machine capable of reliably preventing contact of an object with a cab when an attachment approaches the cab, while restraining a speed of the attachment from being limited in a state where the attachment is sufficiently apart from the cab.

In order to solve the foregoing problem, the present invention provides a construction machine including: a machine body formed with an operation room; an attachment having a base end portion attached to the machine body and a distal end portion on a side opposite to the base end portion, and configured to be changeable in posture so that the distal end portion is displaced with respect to the operation room; a drive unit for driving the attachment so that a speed of the distal end portion is adjustable; a posture detector for detecting a posture of the attachment; a distance detector capable of detecting a distance from the operation room to an object to be detected outside the operation room; and a control apparatus configured to control the drive unit so as to prevent the attachment from interfering with the operation room based on detection results of the posture detector and the distance detector, wherein in a period when the distal end portion of the attachment approaches the operation room, (i) when it is confirmed that the distal end portion of the attachment has reached a predetermined distance detection start position apart from the operation room based on the posture of the attachment detected by the posture detector, the control apparatus determines whether or not the object to be detected has reached a predetermined stop position closer to the operation room than the distance detection start position based on the distance of the object to be detected by the distance detector, and controls the drive unit so as to stop the attachment when determining that the object to be detected has reached the stop position, and (ii) the control apparatus controls the drive unit so that the speed of the distal end portion of the attachment becomes a predetermined target speed or lower when the distal end portion of the attachment reaches the distance detection start position.

According to the present invention, contact of the object with the cab when the attachment approaches the cab can be reliably prevented, while restraining the speed of the attachment from being limited in the state where the attachment is sufficiently apart from the cab.

DETAILED DESCRIPTION OF INVENTION

Hereinafter, embodiments of the present invention will be described with reference to the accompanying drawings. The following embodiments are examples in which the present invention is embodied, and do not limit a technical scope of the present invention.

First Embodiment (FIGS. 1 to 5)

Figure 1:
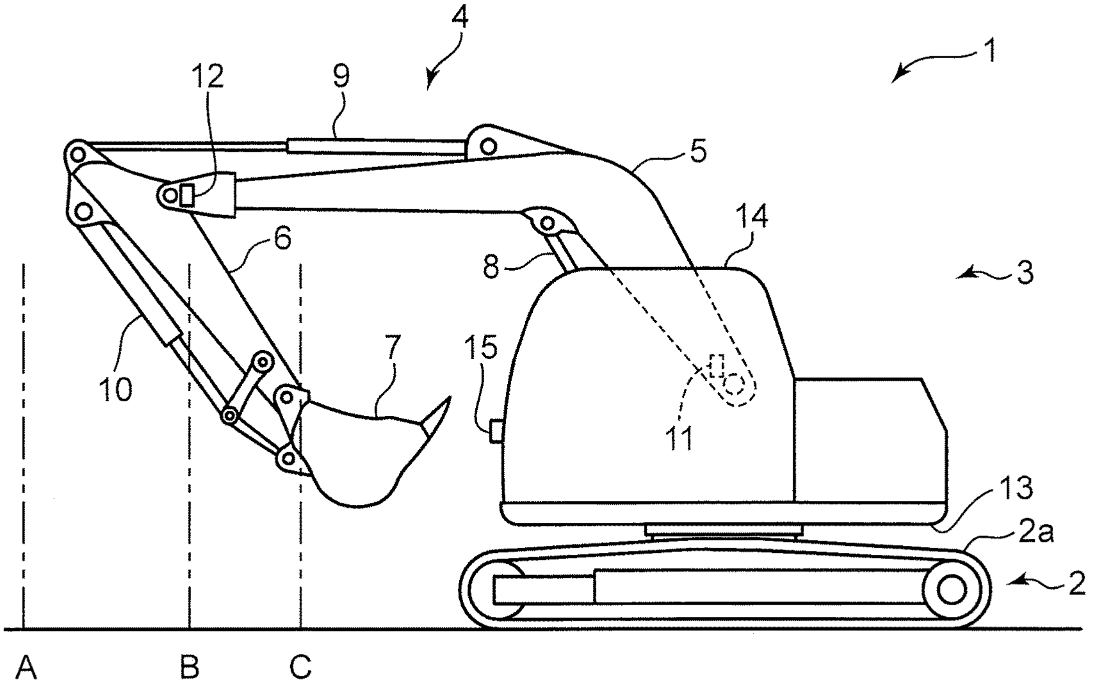
FIG. 1 is a side view showing an entire configuration of a hydraulic shovel according to a first embodiment of the present invention.

Referring to FIG. 1, a construction machine 1 as one example of a construction machine according to a first embodiment of the present invention includes a lower propelling body 2 having a crawler 2*a*, an upper stewing body 3 provided turnably on the lower propelling body 2, and an attachment 4 attached to the upper slewing body 3. The lower propelling body 2 and the upper slewing body 3 configure a machine body in which an operation room is defined (formed) by a cab 14 described later.

The attachment 4 has a boom 5 having a base end portion attached rotatably around an axis along a horizontal direction with respect to the upper slewing body 3, an arm 6 having a base end portion attached rotatably around an axis along the horizontal direction with respect to a distal end portion of the boom 5, and a bucket 7 attached to rotatably around an axis along the horizontal direction with respect to a distal end portion of the arm 6.

Moreover, the attachment 4 includes a boom cylinder 8 configured to rotatively drive the boom 5 with respect to the upper slewing body 3, an arm cylinder 9 configured to rotatively drive the arm 6 with respect to the boom 5, and a bucket cylinder 10 configured to rotatively drive the bucket 7 with respect to the arm 6.

In this manner, the attachment 4 has the base end portion of the boom 5 attached to the machine body (the lower propelling body 2 and the upper slewing body 3), and the distal end portion of the arm 6 on the side opposite to the base end portion of the boom 5, and is configured to be changeable in posture in accordance with activation of the boom cylinder 8 and the arm cylinder 9 so that the distal end portion of the arm 6 is displaced with respect to the operation room (the cab 14 described later).

Furthermore, the attachment 4 is provided with a posture detector for detecting a posture of the attachment 4. The posture detector has a boom angle sensor 11 provided in the boom 5, and an arm angle sensor 12 provided in the arm 6. The boom angle sensor 11 detects an angle of the boom 5 with respect to the upper slewing body 3. The arm angle sensor 12 detects an angle of the arm 6 with respect to the boom 5. Both the angle sensors 11, 12 are each configured, for example, by a rotary encoder.

Figure 2:
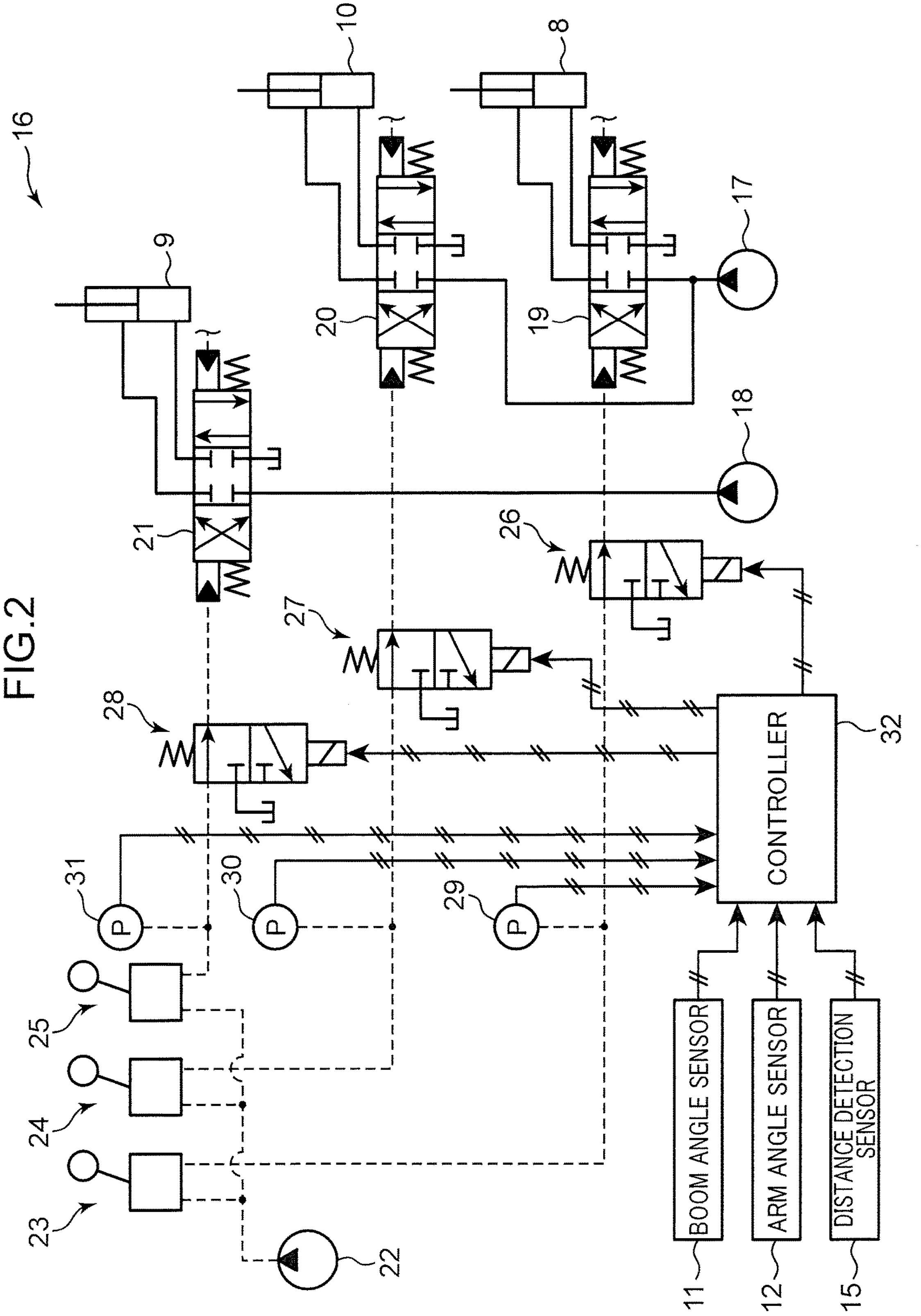
FIG. 2 is a circuit diagram showing a control system provided in a construction machine shown in FIG. 1.
Figure 3:
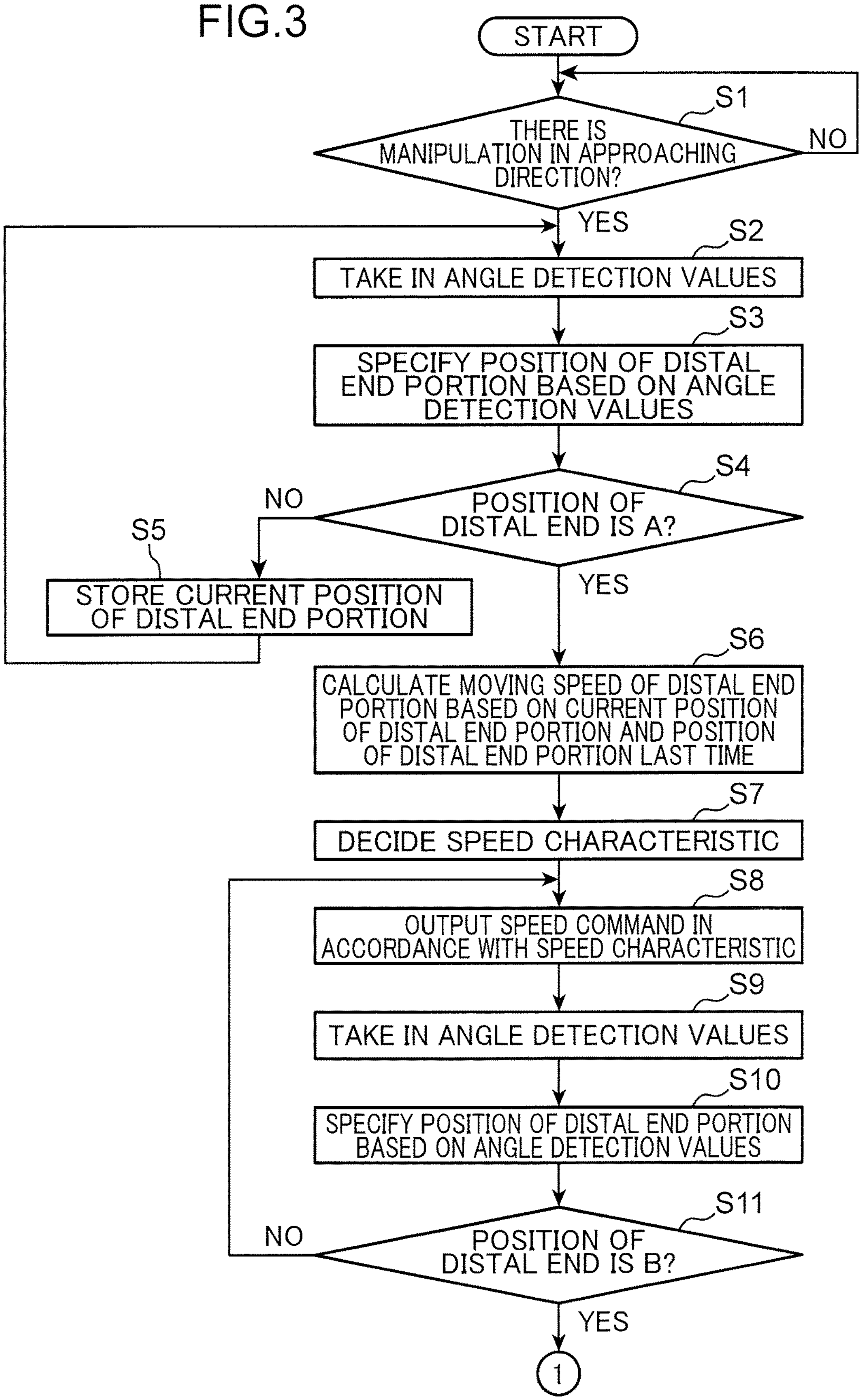
FIG. 3 is a first half part of a flowchart showing processing executed by a controller shown in FIG. 2.
Figure 4:
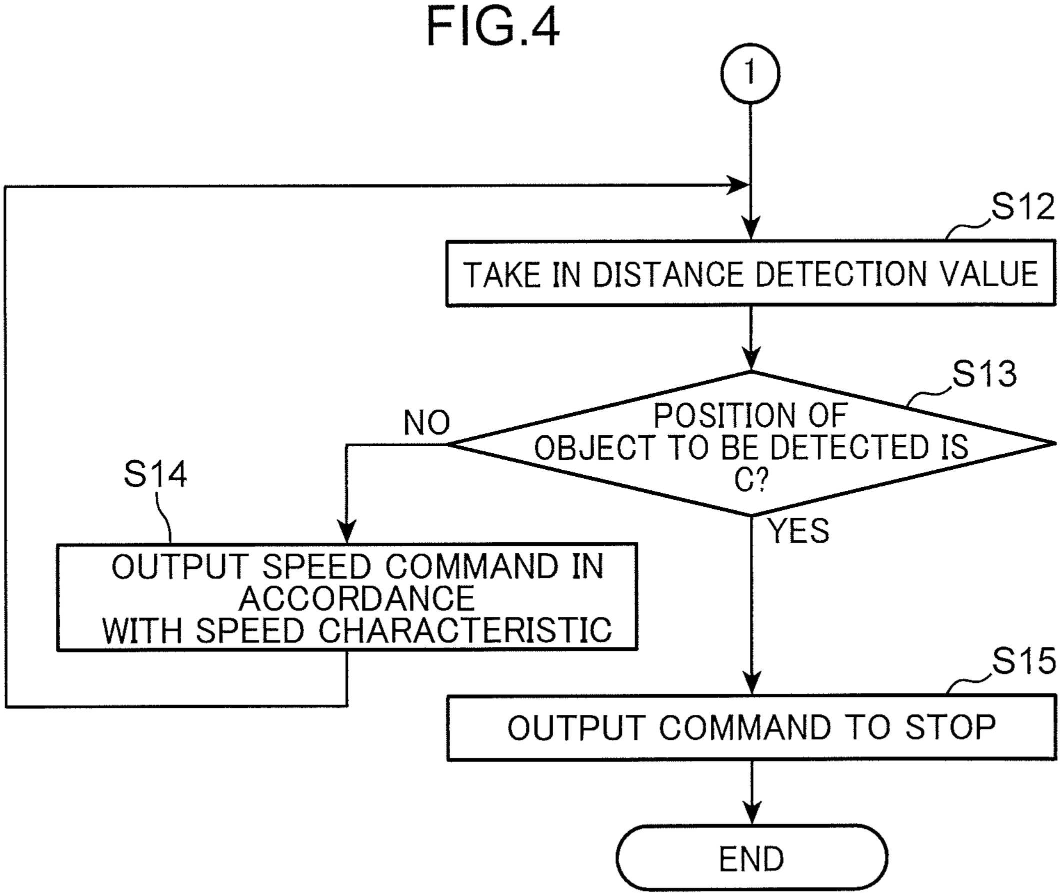
FIG. 4 is a latter half part of the flowchart showing the processing executed by the controller shown in FIG. 2.

Meanwhile, the upper slewing body 3 includes an upper frame 13 turnably attached on the lower propelling body 2, the cab 14 provided on the upper frame 13, a distance detection sensor (a distance detector) 15 attached to the cab 14, and a control system 16 shown in FIG. 2.

The upper frame 13 rotatably supports the base end portion of the attachment 4 (the base end portion of the boom 5).

The cab 14 has a wall portion provided above and a periphery of the operation room (reference numeral is omitted) formed on the upper frame 13. Namely, the cab 14 defines (forms) the operation room in the upper slewing body 3. The cab 14 is provided in a front portion of the upper frame 13.

The distance detection sensor 15 is provided on a front surface of the cab 14, and can detect a distance from the operation room to an object to be detected (e.g., the bucket 7) outside the operation room. As the distance detection sensor 15, for example, an ultrasonic sensor, a depth sensor, and a stereo camera can be employed. The ultrasonic sensor sends an ultrasonic wave to the object to be detected within a predetermined detection range and receives a reflected wave thereof to detect the distance up to the object to be detected on the basis of a time taken from the sending to the reception. The depth sensor emits infrared rays to the object to be detected within the predetermined detection range and receives the infrared rays reflected from the object to be detected to detect the distance up to the object to be detected on the basis of a time taken from the emission to the reception of the infrared rays. The stereo camera has two cameras configured to image the object to be detected at different positions, and detect the distance up to the object to be detected on the basis of a difference in position of the object to be detected in images captured by the respective cameras.

Hereinafter, the control system 16 will be described with reference to FIG. 2.

The control system 16 includes a first hydraulic pump 17 configured to supply hydraulic oil to the boom cylinder 8 and the bucket cylinder 10, a second hydraulic pump 18 configured to supply hydraulic oil to the arm cylinder 9, a control valve for boom 19 provided between the first hydraulic pump 17 and the boom cylinder 8, a control valve for bucket 20 provided between the first hydraulic pump 17 and the bucket cylinder 10, and a control valve for arm 21 provided between the second hydraulic pump 18 and the arm cylinder 9.

The control valve for boom 19 has a neutral position for stopping the boom cylinder 8, a boom rising position (a left position in the figure) for performing an extension operation of the boom cylinder 8 (a rising operation of the boom 5), and a boom lowering position (a right position in the figure) for performing a contraction operation of the boom cylinder 8 (a lowering operation by the boom 5). Moreover, the control valve for boom 19 has pilot ports for switching to the boom rising position and the boom lowering position. Normally, the control valve for boom 19 is biased to the neutral position, and is switched from the neutral position to the boom rising position or the boom lowering position by supplying a pilot pressure to one of the pilot ports.

The control valve for bucket 20 is connected to the first hydraulic pump 17 in parallel to the control valve for boom 19. The control valve for bucket 20 has a neutral position for stopping the bucket cylinder 10, a digging position (a left position in the figure) for performing an extension operation of the bucket cylinder 10 (a digging operation of the bucket 7), and a release position (a right position in the figure) for performing a contraction operation of the bucket cylinder 10 (a release operation of the bucket 7). Moreover, the control valve for bucket 20 has pilot ports for switching to the digging position and the release position of the bucket 7. Normally, the control valve for bucket 20 is biased to the neutral position, and is switched from the neutral position to the digging position or the release position by supplying a pilot pressure to one of the pilot ports.

The control valve for arm 21 has a neutral position for stopping the arm cylinder 9, an arm withdrawing position (a left position in the figure) for performing an extension operation of the arm cylinder 9 (a withdrawing operation of the arm 6), and an arm pushing position (a right position in the figure) for performing a contraction operation of the arm cylinder 9 (a pushing operation of the arm 6). Moreover, the control valve for arm 21 has pilot ports for switching to the arm withdrawing position and the arm pushing position. Normally, the control valve for arm 21 is biased to the neutral position, and is switched from the neutral position to the arm withdrawing position or the arm pushing position by supplying a pilot pressure to one of the pilot ports.

Moreover, the control system 16 includes a pilot pump 22 configured to supply the pilot pressures to the control valves 19 to 21, manipulation unit for boom 23 provided between the pilot pump 22 and the control valve for boom 19, manipulation unit for bucket 24 provided between the pilot pump 22 and the control valve for bucket 20, and manipulation unit for arm 25 provided between the pilot pump 22 and the control valve for arm 21.

The manipulation unit 23 to 25 each have a manipulation lever and a remote control valve configured to output a pilot pressure in accordance with a manipulation amount of the manipulation lever. The pilot pressures outputted from the manipulation unit 23 to 25 are supplied to the pilot ports of the control valves 19 to 21, respectively.

Further, the control system 16 includes an electromagnetic valve for boom 26 provided between the manipulation unit for boom 23 and the pilot port of the control valve for boom 19 on the boom rising side, an electromagnetic valve for bucket 27 provided between the manipulation unit for bucket 24 and the pilot port of the control valve for bucket 20 on the digging side, and an electromagnetic valve for arm 28 provided between the manipulation unit for arm 25 and the pilot port of the control valve for arm 21 on the arm withdrawing side.

The electromagnetic valves 26 to 28 have connection positions where the manipulation unit 23 to 25 and the pilot ports are connected (upper positions in the figure), respectively, and decompression positions where the manipulation unit 23 to 25 are shut off from the respective pilot ports (lower positions in the figure) and the pilot ports are connected to a tank. Moreover, each of the electromagnetic valves 26 to 28 is normally biased to the connection position, and is switched to the decompression position by input of a command from a controller 32 described later. Specifically, each of the electromagnetic valves 26 to 28 is configured such that a movement amount from the connection position to the decompression position, that is, an extent of decompression of the pilot pressure can be adjusted in accordance with a magnitude of a command value from the controller. The pressures on primary sides (the respective manipulation unit 23 to 25 sides) of the respective electromagnetic valves 26 to 28 are detected by pilot pressure sensors 29 to 31, respectively.

The cylinders 8, 9, the pumps 17, 18, 22, the control valves 19, 21, the manipulation unit 23, 25, and the electromagnetic valves 26, 28 configure drive unit for driving the attachment 4 so that a speed of the distal end portion of the attachment 4 (the distal end portion of the arm 6) can be adjusted.

The control system 16 includes the controller (a control apparatus) 32 configured to control the drive unit so as to prevent the attachment 4 from interfering with the cab 14 on the basis of detection results of the foregoing posture detector (the boom angle sensor 11 and the arm angle sensor 12) and the distance detection sensor 15.

Specifically, detection signals from the pilot pressure sensors 29 to 31 are inputted to the controller 32, and the controller 32 determines whether or not an operation in which the distal end portion of the bucket 7 approaches the cab 14 (hereinafter, referred to as an approaching operation) is being performed on the basis of these detection signals. In a period of this approaching operation, the distal end portion of the attachment 4 (the distal end portion of the arm 6) approaches the cab 14, and the controller 32 executes the following control in this period.

Referring to FIGS. 1 and 2, the controller 32 specifies the distal end portion of the attachment 4 (the distal end portion of the arm 6) on the basis of the posture of the attachment 4 detected by the posture detector. Specifically, the controller 32 specifies a position of the distal end portion of the boom 5 on the basis of the angle of the boom 5 detected by the boom angle sensor 11, and a length of the boom 5 stored in advance. Furthermore, the controller 32 specifies a position of the distal end portion of the arm 6 on the basis of the angle of the arm 6 detected by the arm angle sensor 12, and a length of the arm 6 stored in advance.

When it is confirmed that the attachment 4 has reached a predetermined distance detection start position B apart from the cab 14, the controller 32 determines whether or not an object to be detected has reached a stop position C on the basis of a distance of the object to be detected by the distance detection sensor 15.

Here, the distance detection start position B is a front position of the cab 14 (the operation room).

Moreover, the stop position C is a position closer to the cab 14 than the distance detection start position B (a position behind the distance detection start position B), and a position preset to prevent the interference between the attachment 4 and the cab 14. Specifically, the stop position C is set so that the bucket 7 does not come into contact with the attachment 4 in a state where the distal end portion of the arm 6 has reached the stop position C. In other words, the stop position C is set in light of a safety area based on an operation area of the bucket 7.

Furthermore, when it is determined that the object to be detected has reached the stop position C, the controller 32 controls the drive unit so as to stop the attachment 4.

This can stop the operation of the attachment 4 and prevent contact between the object and the cab 14, if there exists the object approaching the cab 14 up to the stop position C.

Moreover, the controller 32 controls the drive unit so that the speed of the distal end portion of the attachment 4 becomes a predetermined target speed or lower, when the distal end portion of the attachment 4 reaches the distance detection start position B. The target speed is a speed preset so that a detection accuracy of the object to be detected by the distance detection sensor 15 can be sufficiently secured in relationship to a processing capacity of the controller 32.

Specifically, the controller 32 has a timer (not shown) configured to measure an elapsed time from a time when the distal end position of the attachment 4 is specified the last time to a time when the distal end position of the attachment 4 is specified this time, and specifies the speed of the distal end portion of the attachment 4 on the basis of a moving distance of the attachment 4 based on the two distal end positions, and the times measured by the timer. Namely, the posture detector (the boom angle sensor 11 and the arm angle sensor 12) and the controller 32 configure speed detector for detecting the speed of the distal end portion of the attachment 4. As the speed detector, a speed sensor capable of detecting the speed of the distal end portion of the attachment 4 can also be provided.

Furthermore, if the speed of the distal end portion of the attachment 4 at a deceleration start position A, which is detected by the speed detector, is higher than the target speed, the controller 32 controls the drive unit so that the speed of the distal end portion is continuously decreased to the target speed in accordance with the movement of the distal end portion of the attachment 4 from the deceleration start position A to the distance detection start position B. The deceleration start position A is a position further apart from the operation room (the cab 14) than the distance detection start position B.

Figure 5:
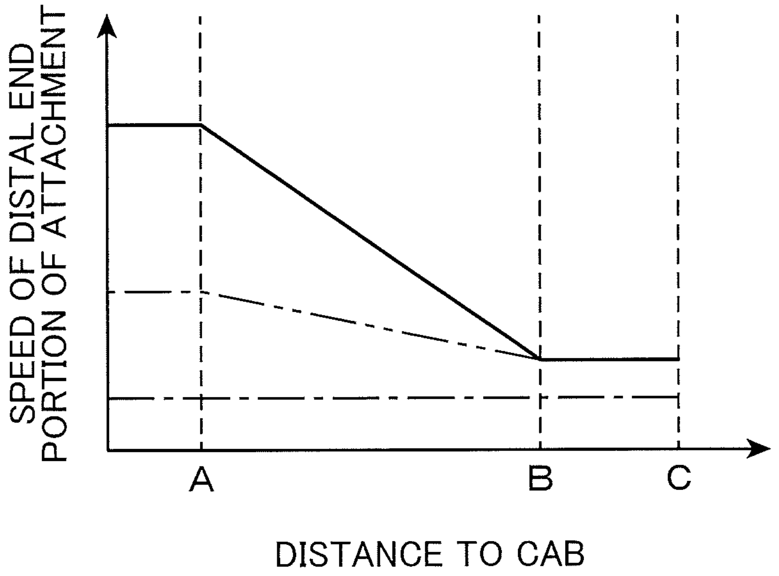
FIG. 5 is a graph showing a deceleration characteristic of an attachment decided by the controller shown in FIG. 2.

Specifically, as shown in FIG. 5, the controller 32 decides a deceleration characteristic indicating a relationship between the position and the speed of the distal end portion of the attachment 4 in a range of the deceleration start position A to the distance detection start position B on the basis of the speed of the distal end portion of the attachment 4 at the deceleration start position A and the target speed. The controller 32 then controls the drive unit on the basis of the position of the distal end portion of the attachment 4 specified using the posture detector and the deceleration characteristic.

If the speed of the distal end portion of the attachment 4 at the deceleration start position A is relatively high, as indicated by solid line in FIG. 5, the deceleration characteristic exhibits a steep gradient, and if the speed of the distal end portion of the attachment 4 at the deceleration start position A is relatively low, as indicated by two-dot chain line, the gradient of the deceleration characteristic is relatively moderate. While in FIG. 5, the linear deceleration characteristics are shown, a curved deceleration characteristic can also be employed as long as it is a characteristic that the speed of the attachment 4 is continuously decreased from the deceleration start position A to the distance detection start position B.

On the other hand, if the speed of the distal end portion of the attachment 4 at the deceleration start position A is equivalent to or lower than the target speed, the controller 32 decides a speed characteristic that the speed becomes constant at a speed at the deceleration start position A, as indicated by one-dot chain line in FIG. 5, and controls the drive unit on the basis of this speed characteristic and the position of the distal end portion of the attachment 4.

The speeds of the distal end portion of the attachment 4 in a range between the distance detection start position B to the stop position C in the characteristics shown in FIG. 5 are constant at speeds at the distance detection start position B (speeds lower than the target speed).

Hereinafter, processing executed by the controller 32 will be described with reference to FIGS. 1 to 4.

First, it is detected whether or not the distal end portion of the attachment 4 is operating in a direction approaching the cab 14 (step S1). Specifically, if the rising operation of the boom 5, the withdrawing operation of the arm 6, and the digging operation of the bucket 7 are performed on the basis of the detection results of the pilot pressure sensors 29 to 31, YES is determined in step S1.

If YES is determined in step S1, angle detection values are taken in from the boom angle sensor 11 and the arm angle sensor 12 (step S2), and the position of the distal end portion of the attachment 4 (the distal end portion of the arm 6) is specified on the basis of these angle detection values (step S3).

Subsequently, it is determined whether or not the position of the distal end portion of the attachment 4 is the deceleration start position A (step S4), and if it is determined that the position of the distal end portion of the attachment 4 is farther from the cab 14 than the deceleration start position A (NO in step S4), a current position of the distal end portion of the attachment 4 is stored (step S5), and the processing returns to step S2.

On the other hand, if YES is determined in step S4, the moving speed of the distal end portion of the attachment 4 is calculated on the basis of the current position of the distal end portion of the attachment 4, the position of the distal end portion of the attachment 4 at the time of last detection, and an interval (measurement times) when these detections are performed (step S6).

Subsequently, the speed characteristic (the deceleration characteristics indicated by solid line and two-dot chain line in FIG. 5, and the speed characteristic indicated by one-dot chain line in FIG. 5) is decided on the basis of the speed of the distal end portion of the attachment 4 and the target speed (step S7), and a speed command based on the position of the distal end portion of the attachment 4 and the speed characteristic is outputted (step S8).

Specifically, in step S8, the pilot pressures with respect to the control valve for boom 19 and the control valve for arm 21 (refer to FIG. 2) are specified in order to drive the distal end portion of the attachment 4 at the objective speed in the speed characteristic, and current command values to realize these pilot pressures with respect to the electromagnetic valve for boom 26 and the electromagnetic valve for arm 28 are specified. The controller 32 outputs the current command values specified in this manner.

Subsequently, the angle detection values by the angle sensors 11, 12 are taken in (step S9), the position of the distal end portion of the attachment 4 is specified on the basis of these angle detection values (step S10), and it is determined whether or not the position of the distal end portion of the attachment 4 is the distance detection start position B (step S11).

If it is determined that the position of the distal end portion of the attachment 4 is farther from the cab 14 than the distance detection start position B (NO in step S11), the processing returns to step S8, and the speed command is outputted so as to set a speed corresponding to the current position of the distal end portion of the attachment 4.

On the other hand, if it is determined that the position of the distal end portion of the attachment 4 is the distance detection start position B (YES in step S11), the detection value (the distance up to the object to be detected) by the distance detection sensor 15 is taken in (step S12), and it is determined whether or not the position of the object to be detected is the stop position C (step S13).

If it is determined that the position of the object to be detected is farther from the cab 14 than the stop position C (NO in step S13), the speed command is outputted on the basis of the speed characteristic shown in FIG. 5 (step S14).

Specifically, in the speed characteristic shown in FIG. 5, since the speed between the distance detection start position B to the stop position C is set to be constant at the speed at the distance detection start position B (the speed lower than the target speed), the speed command to move the distal end portion of the attachment 4 at this speed is outputted.

On the other hand, if it is determined that the position of the object to be detected is the stop position C in step S13, a command to stop the attachment 4 is outputted (step S15), and the processing ends.

Specifically, in step S15, an electric command to move all the electromagnetic valves 26 to 28 shown in FIG. 2 to the decompression positions (the lower positions in the figure)

with full stroke is outputted. Thereby, the pilot pressures with respect to all the control valves 19 to 21 become 0, so that the control valves 19 to 21 are each biased to the neutral position. As a result, the activation of all the cylinders 8 to 10 is stopped, which prevents the interference of the attachment 4 with the cab 14.

As described above, the position of the distal end portion of the attachment 4 (the distal end portion of the arm 6) is specified using the posture detector (the boom angle sensor 11 and the arm angle sensor 12) in the area farther from the cab 14 (the operation room) than the distance detection start position B. On the other hand, the position of the distal end portion of the attachment 4 is detected using the distance detection sensor 15 at the distance detection start position B and in the area closer to the cab 14 than the distance detection start position B. Namely, the use area of the posture detector and the use area of the distance detection sensor 15 are distinguished with the distance detection start position B as a reference.

Since this can suppress the use area of the distance detection sensor 15 to be narrow, a sufficient detection accuracy can be obtained if the speed of the distal end portion of the attachment 4 is suppressed to the predetermined speed (the target speed) or lower in only this use area.

On the other hand, in the use area of the posture detector, the speed limit of the attachment 4 can be alleviated, as compared with the use area of the distance detection sensor 15.

Accordingly, the area where the speed limit of the attachment 4 is required can be suppressed to be narrower than that in a case where only the distance detection sensor 15 is used, and in the range where the distance detection sensor 15 is used, the speed of the attachment 4 is suppressed, so that a sufficient detection accuracy can be secured.

Moreover, according to the first embodiment, the following advantageous effects can be obtained.

Since the speed of the distal end portion of the attachment 4 is continuously decreased from the deceleration start position A to the distance detection start position B, uneasiness that an operator feels due to the speed change of the attachment 4 can be reduced.

Since the objective speed of the attachment 4 can be specified on the basis of the position of the distal end portion of the attachment 4, which is specified on the basis of the detection results of the posture detector, and the deceleration characteristic, the processing in the controller 32 can be simplified, as compared with a case where the speed of the attachment 4 is sequentially calculated.

Figure 6:
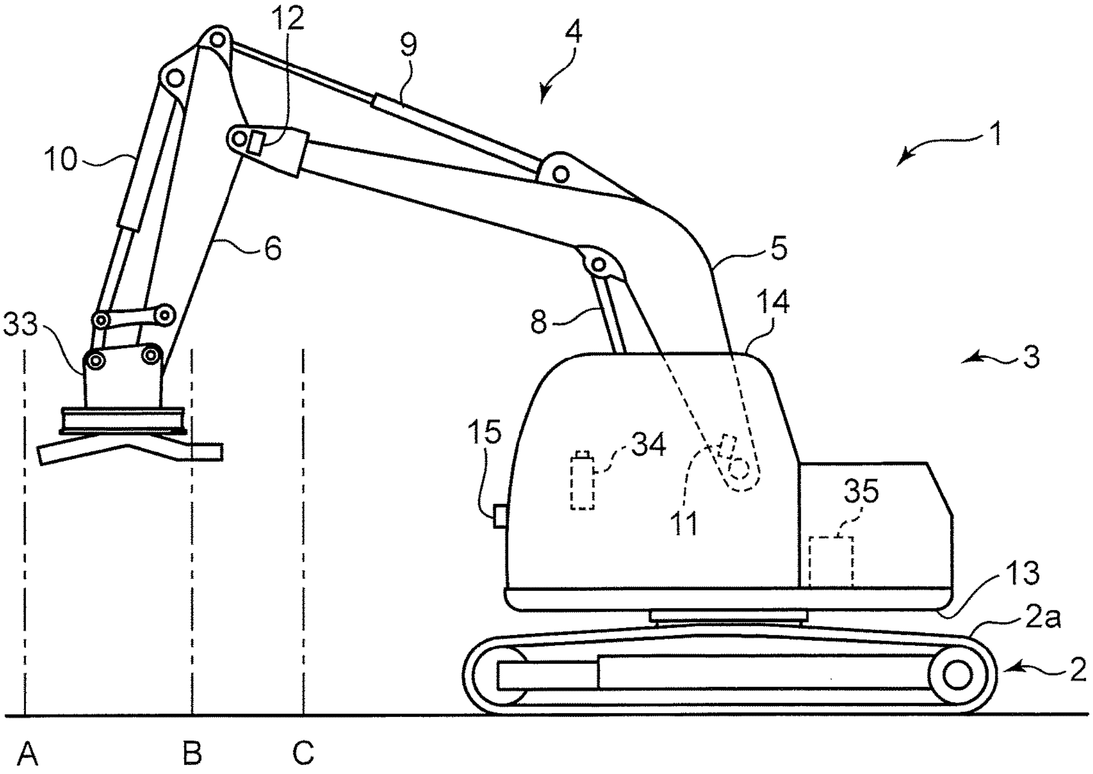
FIG. 6 is a side view showing an entire configuration of a hydraulic shovel according to a third embodiment of the present invention.
Figure 7:
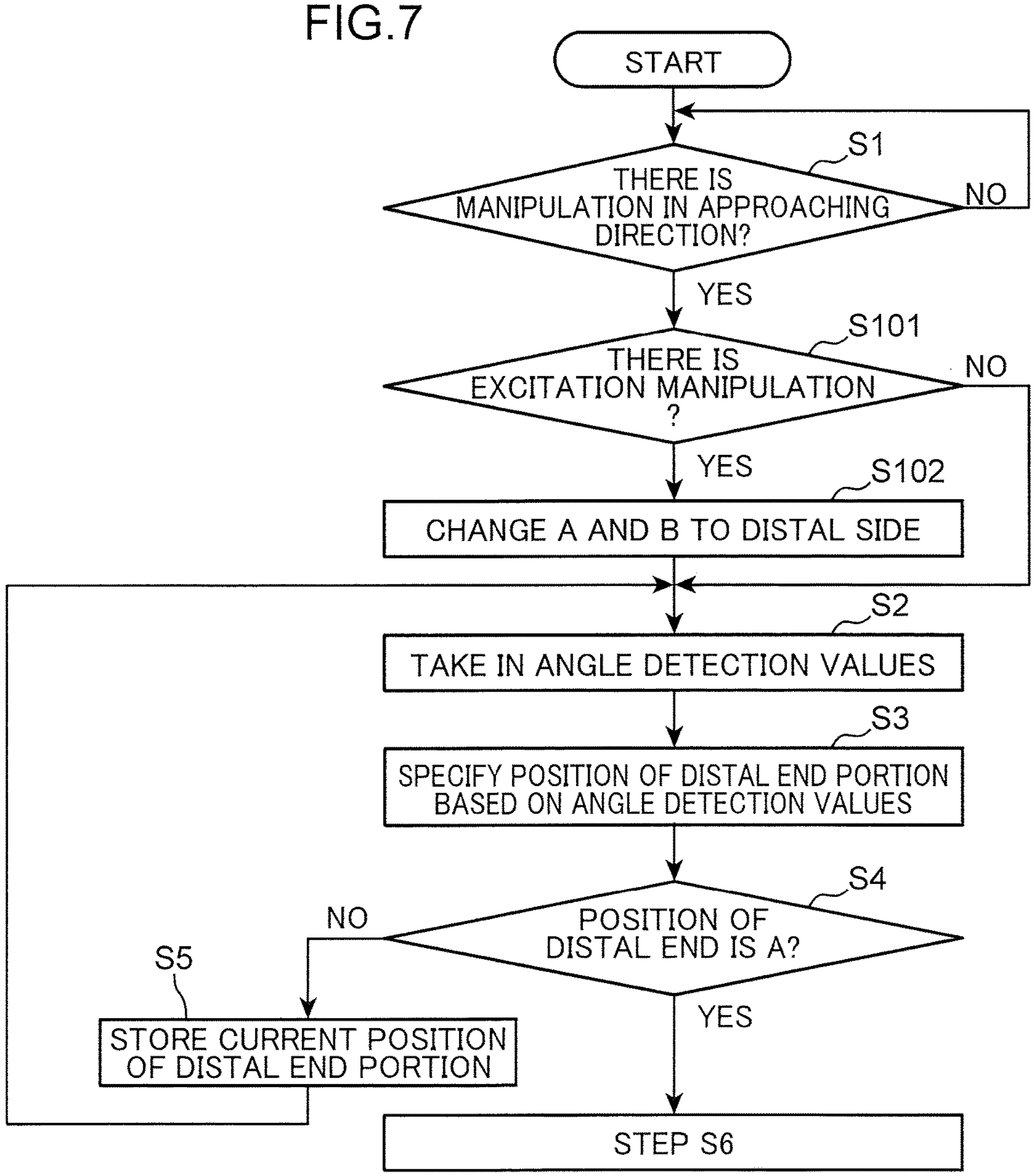
FIG. 7 is a flowchart showing processing executed by a controller provided in the hydraulic shovel shown in FIG. 6.

Second Embodiment (FIGS. 6 and 7)

While the attachment 4 having the bucket 7 for digging has been described in the first embodiment, the attachment 4 may have a holding portion capable of holding an object to be held such as a metal piece and the like.

The construction machine 1 according to a second embodiment includes a lifting magnet (a holding portion) 33 provided in the distal end portion of the arm 6, a power storage apparatus 35 configured to store a power to be supplied to a coil (outside the figure) provided in the lifting magnet 33, and excitation manipulation unit (command output unit) 34 for outputting a holding command to excite the lifting magnet 33 using the power of the power storage apparatus 35.

The controller 32 (refer to FIG. 2) is electrically connected to the lifting magnet 33, the excitation manipulation unit 34, and the power storage apparatus 35 to supply the power of the power storage apparatus 35 to the coil of the lifting magnet 33 in accordance with the holding command from the excitation manipulation unit 34.

In this manner, in the case where the construction machine 1 has the lifting magnet 33 configured to hold the object to be held, there is a concern that the object to be held is held by the lifting magnet 33 in a state where the object to be held extends on the cab 14 side with respect to the distal end portion of the attachment 4, as shown in FIG. 6. In this case, in some lengths of the object to be held, there is a concern that the use area of the distance detection sensor 15 for reliably detecting the object to be held (the area from the distance detection start position B to the stop position C) becomes insufficient.

Consequently, when the holding command is outputted from the excitation manipulation unit 34, the controller 32 changes the distance detection start position B and the stop position C so that the distance detection start position B and the deceleration start position A become farther from the cab 14 than those when the hold command is not outputted.

Referring to FIG. 7, processing executed by the controller 32 will be described.

When the processing is started, it is determined whether or not the distal end portion of the attachment 4 is activating in the direction approaching the cab 14 in the foregoing step S1.

If YES is determined in step S1, it is determined whether or not there is an excitation manipulation using the excitation manipulation unit 34, that is, whether or not the hold command is outputted (step S101).

Here, if it is determined that the holding command is outputted (YES in step S101), the distance detection start position B and the deceleration start position A are changed so that the distance detection start position B and the deceleration start position A are farther from the cab 14 than those when the holding command is not outputted (step S102), and the foregoing step S2 is executed.

On the other hand, if NO is determined in step S101, the foregoing step S2 is executed without performing step S102.

Processing after the step S2 is similar to that in the first embodiment, and thus, a description will be omitted.

According to the second embodiment, when there is a possibility that the object to be held is held by the lifting magnet 33, the use range of the distance detection sensor 15 can be enlarged by making the distance detection start position B farther away from the cab 14. Thus, even if the object to be held extends on the cab 14 side with respect to the distal end portion of the attachment 4, it can be reliably detected that the object to be held has reached the stop position C.

Moreover, not only the distance detection start position B but the deceleration start position A is made farther away from the operation room, which can enlarge a deceleration range where the speed of the distal end portion of the attachment 4 is decreased to the target position. This allows the distal end portion of the attachment 4 to be decelerated more moderately than that in a case where the deceleration start position A is maintained even in a state where the holding command is outputted, so that uneasiness that the operator feels can be alleviated.

While the distance detection start position B and the deceleration start position A are changed in step S102 according to the second embodiment, changing at least the distance detection start position B can reliably prevent the portion to be detected (the object to be held) from interfering with the cab 14.

The present invention is not limited to the foregoing embodiments, but for example, the following aspects can be employed.

While the distal end portion of the arm 6 is used as the distal end portion of the attachment 4 in the foregoing embodiments, the distal end portion of the bucket 7 or the lifting magnet 33 can also be used as the distal end portion of the attachment 4. In this case, sensors to detect angles of the bucket 7 and the lifting magnet 33 need to be provided. Moreover, the distance detection start position B, the stop position C, and the deceleration start position A in light of moving ranges of the bucket 7 and the lifting magnets 33 need to be set.

While the speed of the attachment 4 is continuously decreased from the deceleration start position A to the distance detection start position B in the foregoing embodiments, the speed of the distal end portion of the attachment 4 only needs to be the target speed or lower at the distance detection start position B. For example, if the speed of the distal end portion of the attachment 4 at the deceleration start position A exceeds the target speed, the speed of the distal end portion of the attachment 4 can also be instantly decreased to the target speed at the distance detection start position B or at a position farther from the cab 14 than the distance detection start position B.

While the speed of the distal end portion of the attachment 4 is continuously decreased on the basis of the speed characteristic shown in FIG. 5 in the foregoing embodiments, the speed of the distal end portion of the attachment 4 may be sequentially detected to control (feedback-control) the drive unit so that the speed becomes an objective speed.

While the operation room defined by the cab is exemplified in the foregoing embodiments, the operation room is not limited thereto, and it only needs to be a space provided with an operator seat for an operator to sit on.

While the distance detection start position B, the stop position C, and the deceleration start position A, which are set in front of the cab 14, have been described in the foregoing embodiments, the respective positions only need to be set outside the operator seat. For example, the distance detection start position B, the stop position C, and the deceleration start position A may be set above the cab 14 or on a side of the cab 14 in place of, or in addition to the front of the cab 14.

The foregoing specific embodiments mainly include the invention having the following configuration.

Namely, according to the present invention, provided is a construction machine including: a machine body formed with an operation room; an attachment having a base end portion attached to the machine body and a distal end portion on a side opposite to the base end portion, and configured to be changeable in posture so that the distal end portion is displaced with respect to the operation room; a drive unit for driving the attachment so that a speed of the distal end portion is adjustable; a posture detector for detecting a posture of the attachment; a distance detector capable of detecting a distance from the operation room to an object to be detected outside the operation room; and a control apparatus configured to control the drive unit so as to prevent the attachment from interfering with the operation room based on detection results of the posture detector and the distance detector, wherein in a period when the distal end portion of the attachment approaches the operation room, (i) when it is confirmed that the distal end portion of the attachment has reached a predetermined distance detection start position apart from the operation room based on the posture of the attachment detected by the posture detector, the control apparatus determines whether or not the object to be detected has reached a predetermined stop position closer to the operation room than the distance detection start position based on the distance of the object to be detected by the distance detector, and controls the drive unit so as to stop the attachment when determining that the object to be detected has reached the stop position, and (ii) the control apparatus controls the drive unit so that the speed of the distal end portion of the attachment becomes a predetermined target speed or lower when the distal end portion of the attachment reaches the distance detection start position.

According to the present invention, in the area farther from the operation room than the distance detection start position, the position of the distal end portion of the attachment is specified using the posture detector. On the other hand, at the distance detection start position and in the area closer to the operation room than the distance detection start position, the position of the distal end portion of the attachment is detected using the distance detector. Namely, the use area of the posture detector and the use area of the distance detector are distinguished with the distance detection start position as a reference.

Since this can suppress the use area of the distance detector to be narrow, a sufficient detection accuracy can be obtained if the speed of the distal end portion of the attachment is suppressed to be the predetermined speed (the target speed) or lower only in this use area.

On the other hand, in the use area of the posture detector, the speed limit of the attachment can be alleviated, as compared with the use area of the distance detector.

Thus, according to the present invention, as compared with a case where only the distance detector is used, the area where the speed limit of the attachment is required can be suppressed to be narrow, and in the range where the distance detector is used, the speed of the attachment is suppressed, which can secure a sufficient detection accuracy.

In the present invention "the distal end portion of the attachment" is not limited to a terminal end of the attachment. For example, in the case where the attachment includes the boom, the arm, and the bucket, the distal end portion of the attachment is not limited to the distal end portion of the bucket, but for example, it may be the distal end portion of the arm. In this case, the stop position only needs to be set in light of a safety area based on an operation area of a forefront portion (the bucket) with respect to the distal end portion in the attachment.

Here, if the speed of the distal end portion of the attachment located further apart from the operation room than the distance detection start position is higher than the target speed, the speed of the attachment may be instantly decreased to the target position when the distal end portion of the attachment reaches the distance detection start position. In this case, however, uneasiness that the operator feels is large because the speed of the attachment rapidly changes.

Therefore, preferably, the construction machine further includes a speed detector for detecting the speed of the distal end portion of the attachment, and when it is confirmed that the distal end portion of the attachment has reached a predetermined deceleration start position further apart from the operation room than the distance detection start position based on the posture of the attachment detected by the posture detector, and when the speed of the distal end portion of the attachment at the deceleration start position, which is detected by the speed detector, is higher than the target speed, the control apparatus controls the drive unit so that the speed of the distal end portion is continuously decreased to the target speed in accordance with movement of the distal end portion of the attachment from the deceleration start position to the distance detection start position.

According to this aspect, the speed of the distal end portion of the attachment is continuously decreased from the deceleration start position to the distance detection start position, and therefore, the uneasiness that the operator feels due to the speed change of the attachment can be reduced.

Here, the control apparatus may sequentially detect the speed of the distal end portion of the attachment to control (feedback-control) the drive unit so that the speed becomes an objective speed. In this case, however, processing in the control apparatus becomes complicated.

Therefore, preferably, in the construction machine, the control apparatus decides a deceleration characteristic indicating a relationship between the position and the speed of the distal end portion of the attachment in a range from the deceleration start position to the distance detection start position based on the speed of the distal end portion of the attachment at the deceleration start position, which is detected by the speed detector, and the target speed, and controls the drive unit based on the position of the distal end portion of the attachment based on the detection result of the posture detector, and the deceleration characteristic.

According to this aspect, the objective speed of the attachment can be specified on the basis of the position of the distal end portion of the attachment, which is specified on the basis of the detection result of the posture detector, and the deceleration characteristic, and therefore, the processing in the control apparatus can be simplified, as compared with the case where the speed of the attachment is sequentially calculated.

Here, in the case where the attachment has the holding portion capable of holding the object to be held, there is a concern that the object to be held is held by the holding portion in the state where the object to be held extends on the operation room side with respect to the distal end portion of the attachment. In this case, in some lengths of the object to be held, there is a concern that the use area of the distance detector for reliably detecting the object to be held (the area from the distance detection start position to the stop position) is insufficient.

Therefore, preferably, in the construction machine, the attachment has a holding portion capable of holding an object to be held, the construction machine further includes a command output unit for outputting, to the holding portion, a holding command to hold the object to be held, and when the holding command is outputted from the command output unit, the control apparatus changes the distance detection start position and the deceleration start position so that the distance detection start position and the deceleration start position become farther away from the operation room as compared to a case when the holding command is not outputted.

Moreover, preferably, in the construction machine, the attachment has a holding portion capable of holding an object to be held, the construction machine further includes a command output unit for outputting, to the holding portion, a holding command to hold the object to be held, and when the holding command is outputted from the command output unit, the control apparatus changes the distance detection start position so that the distance detection start position becomes farther away from the operation room as compared to a case when the holding command is not outputted.

According to these aspects, when there is a possibility that the object to be held is held by the holding portion, the distance detection start position is made farther away from the operation room, which can enlarge the use range of the distance detector. Thus, even if the object to be held extends on the operation room side with respect to the distal end portion of the attachment, it can be reliably detected that the object to be held has reached the stop position.

Moreover, according to the aspect in which both the distance detection start position and the deceleration start position are made farther away from the operation room, the deceleration area where the speed of the distal end portion of the attachment is decreased to the target position can be enlarged. Thus, the distal end portion of the attachment can be decelerated more moderately than that in a case where the deceleration start position is maintained even when the holding command is outputted, so that uneasiness of the operator feels can be alleviated.

The invention claimed is:

1. A construction machine comprising:

a machine body formed with an operation room;

an attachment having a base end portion attached to the machine body and a distal end portion on a side opposite to the base end portion, and configured to be changeable in posture so that the distal end portion is displaced with respect to the operation room;

a drive unit for driving the attachment so that a speed of the distal end portion is adjustable;

a posture detector for detecting a posture of the attachment;

a distance detector capable of detecting a distance from the operation room to an object to be detected outside the operation room; and a control apparatus configured to control the drive unit so as to prevent the attachment from interfering with the operation room based on detection results of the posture detector and the distance detector, wherein in a period when the distal end portion of the attachment approaches the operation room, (i) when it is confirmed that the distal end portion of the attachment has reached a predetermined distance detection start position apart from the operation room based on the posture of the attachment detected by the posture detector, the control apparatus determines whether or not the object to be detected has reached a predetermined stop position closer to the operation room than the distance detection start position based on the distance of the object to be detected by the distance detector, and controls the drive unit so as to stop the attachment when determining that the object to be detected has reached the stop position, and (ii) the control apparatus controls the drive unit so that the speed of the distal end portion of the attachment becomes a predetermined target speed or lower when the distal end portion of the attachment reaches the distance detection start position, and a speed detector for detecting the speed of the distal end portion of the attachment, wherein when it is confirmed that the distal end portion of the attachment has reached a predetermined deceleration start position further apart from the operation room than the distance detection start position based on the posture of the attachment detected by the posture detector, and when the speed of the distal end portion of the attachment at the deceleration start position, which is detected by the speed detector, is higher than the target speed, the control apparatus controls the drive unit so that the speed of the distal end portion is continuously decreased to the target speed in accordance with movement of the distal end portion of the attachment from the deceleration start position to the distance detection start position.

2. The construction machine according to claim 1, wherein the control apparatus decides a deceleration characteristic indicating a relationship between the position and the speed of the distal end portion of the attachment in a range from the deceleration start position to the distance detection start position based on the speed of the distal end portion of the attachment at the deceleration start position, which is detected by the speed detector, and the target speed, and controls the drive unit based on the position of the distal end portion of the attachment based on the detection result of the posture detector, and the deceleration characteristic.

* * * * *